US012603800B2

(12) United States Patent
Heo

(10) Patent No.: US 12,603,800 B2
(45) Date of Patent: Apr. 14, 2026

(54) TERMINATING RESISTANCE SETTING CIRCUIT AND BATTERY MANAGEMENT SYSTEM INCLUDING SAME

(71) Applicant: LG ENERGY SOLUTION, LTD., Seoul (KR)

(72) Inventor: Jin Seok Heo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1103 days.

(21) Appl. No.: 17/633,349

(22) PCT Filed: Jan. 8, 2021

(86) PCT No.: PCT/KR2021/000226
§ 371 (c)(1),
(2) Date: Feb. 7, 2022

(87) PCT Pub. No.: WO2021/149949
PCT Pub. Date: Jul. 29, 2021

(65) Prior Publication Data
US 2022/0285742 A1 Sep. 8, 2022

(30) Foreign Application Priority Data
Jan. 20, 2020 (KR) ........................ 10-2020-0007585

(51) Int. Cl.
*H02J 7/00* (2006.01)
*H01M 10/42* (2006.01)
(Continued)

(52) U.S. Cl.
CPC .... *H04L 25/0272* (2013.01); *H01M 10/4207* (2013.01); *H01M 10/425* (2013.01);
(Continued)

(58) Field of Classification Search
CPC ............. H04L 25/0272; H04L 25/0266; H04L 12/40045; H01M 10/4207; H01M 10/425;
(Continued)

(56) References Cited

U.S. PATENT DOCUMENTS 5,467,453 A * 11/1995 Kocis .................. G06F 13/4086
333/32
6,587,968 B1 7/2003 Leyva
(Continued)

FOREIGN PATENT DOCUMENTS

DE 10 2009 056 563 A1 6/2011
JP 2003-304265 A 10/2003
(Continued)

OTHER PUBLICATIONS

Extended European Search Report for corresponding European Application No. 21745121.0, dated Sep. 29, 2022.
(Continued)

*Primary Examiner* — Zixuan Zhou
(74) *Attorney, Agent, or Firm* — Birch, Stewart, Kolasch & Birch, LLP

(57) ABSTRACT

Disclosed is a terminating resistance setting circuit and a battery management system in a battery system including a plurality of battery modules, the battery management system including at least module controllers that respectively control the plurality of battery modules, in which the module controllers communicate with each other through a differential input mode, and each of a plurality of battery modules includes a terminating resistance setting circuit including a resistance generation unit connected between a pair of communication lines for differential input to generate a terminating resistance, a first control circuit that applies a first control signal to the resistance generation unit, and a second control circuit formed between the resistance gen-
(Continued)

eration unit and a reference potential and controlled to apply a voltage according to the reference potential to the resistance generation unit by a second control signal.

9 Claims, 8 Drawing Sheets

(51) Int. Cl.
     *H04L 12/40*          (2006.01)
     *H04L 25/02*          (2006.01)
(52) U.S. Cl.
     CPC ...... *H02J 7/0013* (2013.01); *H04L 12/40045* (2013.01); *H04L 25/0266* (2013.01); *H01M 2010/4271* (2013.01); *H01M 2010/4278* (2013.01); *Y02D 30/50* (2020.08)
(58) Field of Classification Search
     CPC ... H01M 2010/4271; H01M 2010/4278; H02J 7/0013; Y02D 30/50
     See application file for complete search history.

(56)          References Cited

U.S. PATENT DOCUMENTS

| | | |
|---|---|---|
| 2003/0194015 A1 | 10/2003 | Suganuma et al. |
| 2011/0121645 A1 | 5/2011 | Zhang et al. |
| 2011/0156658 A1 | 6/2011 | Schubert |
| 2011/0175574 A1 | 7/2011 | Sim et al. |
| 2011/0185093 A1 | 7/2011 | Matsuo et al. |
| 2012/0313439 A1 | 12/2012 | Yamaguchi et al. |
| 2014/0091770 A1 | 4/2014 | Lee et al. |
| 2014/0173081 A1 | 6/2014 | Knapp et al. |
| 2014/0312927 A1* | 10/2014 | Lee .................... H04L 25/0272 |
| | | 326/30 |

| | | |
|---|---|---|
| 2014/0365792 A1 | 12/2014 | Yun |
| 2016/0304039 A1 | 10/2016 | Nakagawa et al. |
| 2016/0359329 A1 | 12/2016 | Kim et al. |
| 2017/0237707 A1 | 8/2017 | Jo |
| 2017/0250833 A1 | 8/2017 | Morizono et al. |
| 2018/0269543 A1 | 9/2018 | Kim et al. |
| 2020/0004717 A1 | 1/2020 | Tagashira et al. |
| 2020/0373782 A1 | 11/2020 | Baba et al. |

FOREIGN PATENT DOCUMENTS

| | | |
|---|---|---|
| JP | 2006-174352 A | 8/2006 |
| JP | 2011-182623 A | 3/2011 |
| JP | 2015-507451 A | 3/2015 |
| JP | 2015-162802 A | 9/2015 |
| JP | 2015-162803 A | 9/2015 |
| JP | 2016-54362 A | 4/2016 |
| JP | 5902149 B2 | 4/2016 |
| JP | 2018-142801 A | 9/2018 |
| JP | 2015-57023 A | 12/2025 |
| JP | 2016-92607 A | 12/2025 |
| KR | 10-1156342 B1 | 6/2012 |
| KR | 10-2014-0143076 A | 12/2014 |
| KR | 10-1539689 B1 | 7/2015 |
| KR | 10-2016-0041260 A | 4/2016 |
| KR | 10-2016-0092718 A | 8/2016 |
| KR | 10-2016-0143092 A | 12/2016 |
| KR | 10-2017-0051071 A | 5/2017 |
| KR | 10-2018-0105830 A | 10/2018 |
| WO | WO 2019/146655 A1 | 8/2019 |

OTHER PUBLICATIONS

International Search Report (PCT/ISA/210) issued in PCT/KR2021/000226, dated Mar. 31, 2021.

* cited by examiner

TERMINATING RESISTANCE SETTING CIRCUIT AND BATTERY MANAGEMENT SYSTEM INCLUDING SAME

CROSS-REFERENCE TO RELATED APPLICATIONS

This application claims the benefit of Korean Patent Application No. 10-2020-0007585, filed on Jan. 20, 2020, in the Korean Intellectual Property Office, the disclosure of which is incorporated herein in its entirety by reference.

TECHNICAL FIELD

The present invention relates to a terminating resistance setting circuit and a battery management system including the same.

BACKGROUND ART

Recently, research on a secondary battery as a power supply source is being actively conducted in accordance with the spread of an electronic device such as a smartphone and an electric vehicle, and expansion of infrastructure for an energy storage system (ESS).

In the case of an energy storage system, it not only needs to store a large amount of electric energy, but also requires high output. To this end, the energy storage system is used in the form of a battery rack including a plurality of battery modules connected in series and/or in parallel and a charging and discharging device for charging and discharging the plurality of battery modules. The battery module includes battery cells, which are secondary batteries, connected in series and/or in parallel. Further, the battery rack includes a rack controller (rack battery management system (BMS)) for controlling the charging and discharging device, and a plurality of module controllers (module BMSs) that respectively control the plurality of battery modules.

In order to stably operate the energy storage system, communication between the rack controller and the module controller is essential, and in this case, a communication protocol of differential input mode is used for communication between the controllers. However, in the case of the communication protocol of differential input mode, communication nodes located at both ends need terminating resistances. This is a configuration provided to avoid a reflection phenomenon occurring in the communication node.

Previously, the terminating resistance was inserted by adding a resistor directly to the communication node located at a termination. However, in the case of such a previous method of inserting the terminating resistance, there is a possibility that the terminating resistance may be inserted into a wrong position or may not be properly inserted, such as short-circuited at both ends of the resistor.

DISCLOSURE OF THE INVENTION

Technical Problem

The present invention has been made to solve the problems described above, and an object thereof is to provide a terminating resistance setting circuit capable of automatically setting a terminating resistance accurately and simply, and a battery management system including the same.

Technical Solution

In order to solve the technical problems as described above, according to one aspect of embodiments of the present invention, there is provided a battery management system in a battery system including a plurality of battery modules, the battery management system including a plurality of module controllers that respectively control the plurality of battery modules, in which the plurality of module controllers communicate with each other through a differential input mode, and each battery module includes a terminating resistance setting circuit including a resistance generation unit connected between a pair of communication lines for differential input to generate a terminating resistance, a first control circuit that applies a first control signal to the resistance generation unit, and a second control circuit formed between the resistance generation unit and a reference potential and controlled to apply a voltage according to the reference potential to the resistance generation unit by a second control signal.

In order to solve the technical problems described above, according to another aspect of embodiments of the present invention, there is provided a terminating resistance setting circuit provided in each of a plurality of communication devices that perform communication in a differential input mode, the terminating resistance setting circuit including a resistance generation unit connected between a pair of communication lines for differential input to generate a terminating resistance, a first control circuit that applies a first control signal to the resistance generation unit, and a second control circuit formed between the resistance generation unit and a reference potential and controlled to apply a voltage according to the reference potential to the resistance generation unit by a second control signal.

Advantageous Effects

According to the terminating resistance setting circuit as described above and the battery management system including the same, a terminating resistance can be automatically set when performing communication in the differential input mode, and various mistakes or failures occurring when setting the terminating resistance can be prevented.

MODE FOR CARRYING OUT THE INVENTION

Figure 1:
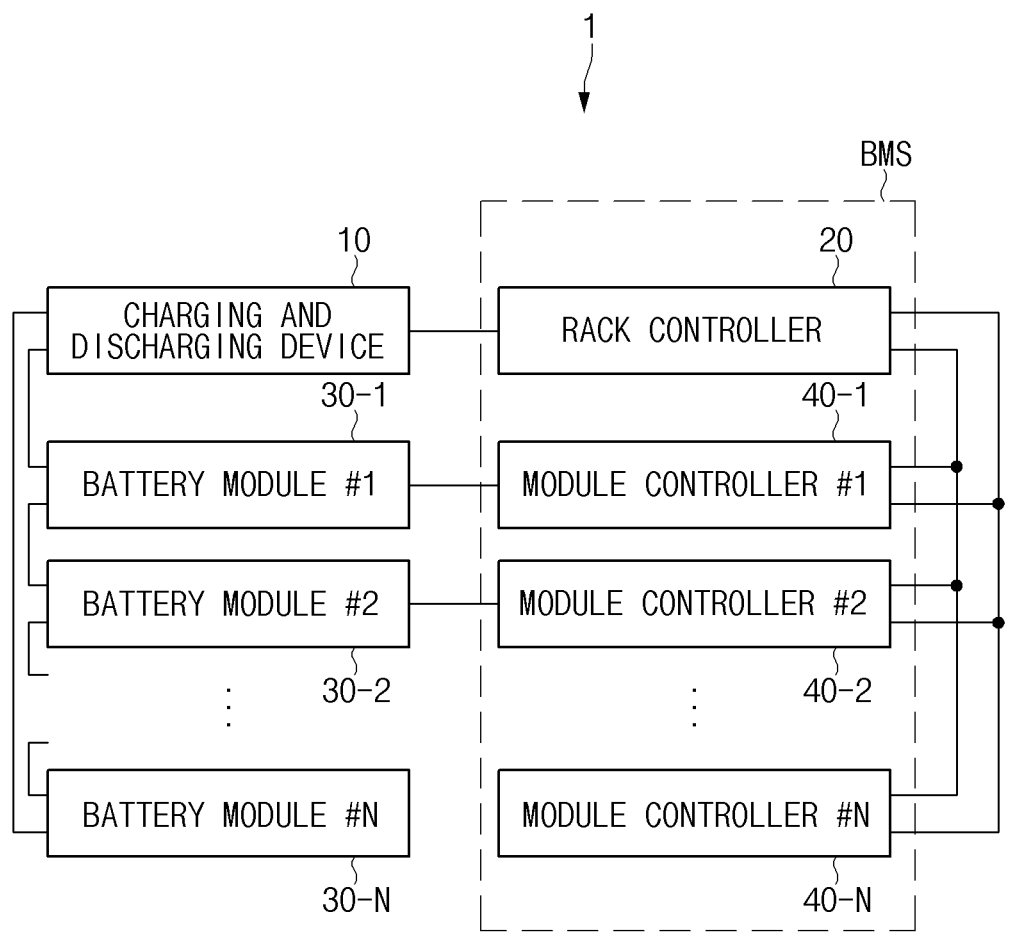
FIG. 1 is a diagram schematically illustrating a battery system according to an embodiment of the present invention.

Hereinafter, various embodiments of the present invention will be described in detail with reference to the accompanying drawings. In this document, the same reference numerals are used for the same constituent elements in the drawings, and duplicate descriptions for the same constituent elements are omitted.

With respect to the various embodiments of the present invention disclosed in this document, specific structural or functional descriptions have been exemplified for the purpose of describing the embodiments of the present invention only, and various embodiments of the present invention may be embodied in various forms and should not be construed as being limited to the embodiments described in this document.

Expressions such as "first", "second", "firstly", or "secondly", etc. used in various embodiments may modify various constituent elements regardless of order and/or importance, and do not limit corresponding constituent elements. For example, without deviating from the scope of the present invention, a first constituent element may be named as a second constituent element, and similarly, the second constituent element may also be renamed as the first constituent element.

The terms used in this document are only used to describe a specific embodiment, and may not be intended to limit the scope of other embodiments. Singular expressions may include plural expressions unless the context clearly indicates otherwise.

FIG. 1 is a diagram schematically illustrating a battery system 1 according to an embodiment of the present invention. The battery system 1 may be a battery rack. The battery rack 1 is a unit that stores electrical energy in an energy storage system. One or more such battery racks 1 may be included in the energy storage system.

Referring to FIG. 1, the battery rack 1 includes a charging and discharging device 10 and a plurality of battery modules 30-1 to 30-N. Further, the battery rack 1 includes a rack controller 20 that controls the charging and discharging device 10 and module controllers 40-1 to 40-N that respectively control a plurality of battery modules 30-1 to 30-N. (In the following, when there is no need to distinguish between the battery modules and the module controllers, reference numerals thereof will be described as the battery module 30 and the module controller 40, respectively.)

The charging and discharging device 10 charges and discharges the battery module 30. The charging and discharging device 10 supplies power to the battery module 30 or supplies power from the battery module 30 to a load. The charging and discharging device 10 may be connected to a system to receive power from the system, and may supply the received power to the battery module 30. Further, the charging and discharging device 10 may supply power discharged from the battery module 30 to a system or a load (e.g., a factory, a home, etc.). The charging and discharging device 10 may include a switching device for charging and discharging the battery module 30, for example, a relay.

A rack controller (RBMS (rack battery management system)) 20 controls an overall operation of the battery rack 1, and manages a state of the battery rack 1. The rack controller 20 controls the operation of the charging and discharging device 10. For example, the rack controller 20 may monitor the temperature of the battery rack 1, etc. and monitor whether or not the charging and discharging device 10 has failed, etc.

The rack controller 20 may be configured to communicate with the module controller 40. The rack controller 20 may receive various data related to the battery module 30 from the module controller 40. Further, the rack controller 20 may transmit various control signals for controlling the battery module 30 to the module controller 40. That is, the rack controller 20 may perform function as an upper-level controller with respect to the module controllers 40. Further, the rack controller 20 may perform function as a master controller in performing communication with the module controllers 40 in the system.

The battery module 30 stores electrical energy and supplies the stored electrical energy to the system or load. The battery module 30 receives and stores power from a system, etc. The battery module 30 may include a plurality of battery cells connected in series and/or in parallel. The battery cell may be a secondary battery such as a lithium ion (Li-ion) battery, a lithium ion polymer battery, a nickel cadmium (Ni—Cd) battery, and a nickel hydride (Ni-MH) battery, but is not limited thereto.

The module controller (MBMS (module battery management system)) 40 controls charging and discharging of the battery module 30, and manages the state thereof. The module controller 40 may monitor the voltage, current, temperature, etc. of the battery module 30. Further, the module controller 40 may additionally include a sensor or various measurement modules (not illustrated) for monitoring. The module controller 40 may calculate a parameter indicating the state of the battery module 30, for example, state of charge (SOC) or state of health (SOH), based on measured values such as the monitored voltage, current, and temperature of the battery module 30.

The module controller 40 may be configured to communicate with the rack controller 20. The module controller 40 may receive a control signal such as a command for controlling the battery module 30 from the rack controller 20. The module controller 40 may transmit a measured value by the monitoring described above or a parameter calculated from the measured value to the rack controller 20.

The rack controller 20 and the plurality of module controllers 40-1 to 40-N are collectively referred to as a battery management system (BMS). The rack controller 20 and the plurality of module controllers 40-1 to 40-N of the battery management system (BMS) may communicate with each other through a communication protocol of differential input mode. In this case, each of the rack controller 20 and the plurality of module controllers 40-1 to 40-N corresponds to a communication node. Examples of the communication protocol of differential input mode include controller area network (CAN) recommended standard 485 (RS-485), recommended standard 422 (RS-422), etc.

Each of the plurality of module controllers 40-1 to 40-N includes a terminating resistance setting configured to be able to automatically set the terminating resistance. A specific configuration of the terminating resistance setting circuit will be described later. In FIG. 1, only the configuration in which the rack controller 20 and plurality of module controllers are included in the battery management system (BMS) are connected by a pair of communication lines is illustrated, the configuration is not limited thereto, and an additional configuration connecting them may be included. For example, when the rack controller 20 and the plurality of module controllers 40-1 to 40-N of the battery management system (BMS) initiate communication, an ID (or a plurality of ID's) may need be assigned. To this end, the rack controller 20 and the plurality of module controllers 40-1 to 40-N may additionally be provided with separate lines for transmitting and receiving wake-up signals etc. for operating communication modules respectively included therein.

Figure 2:
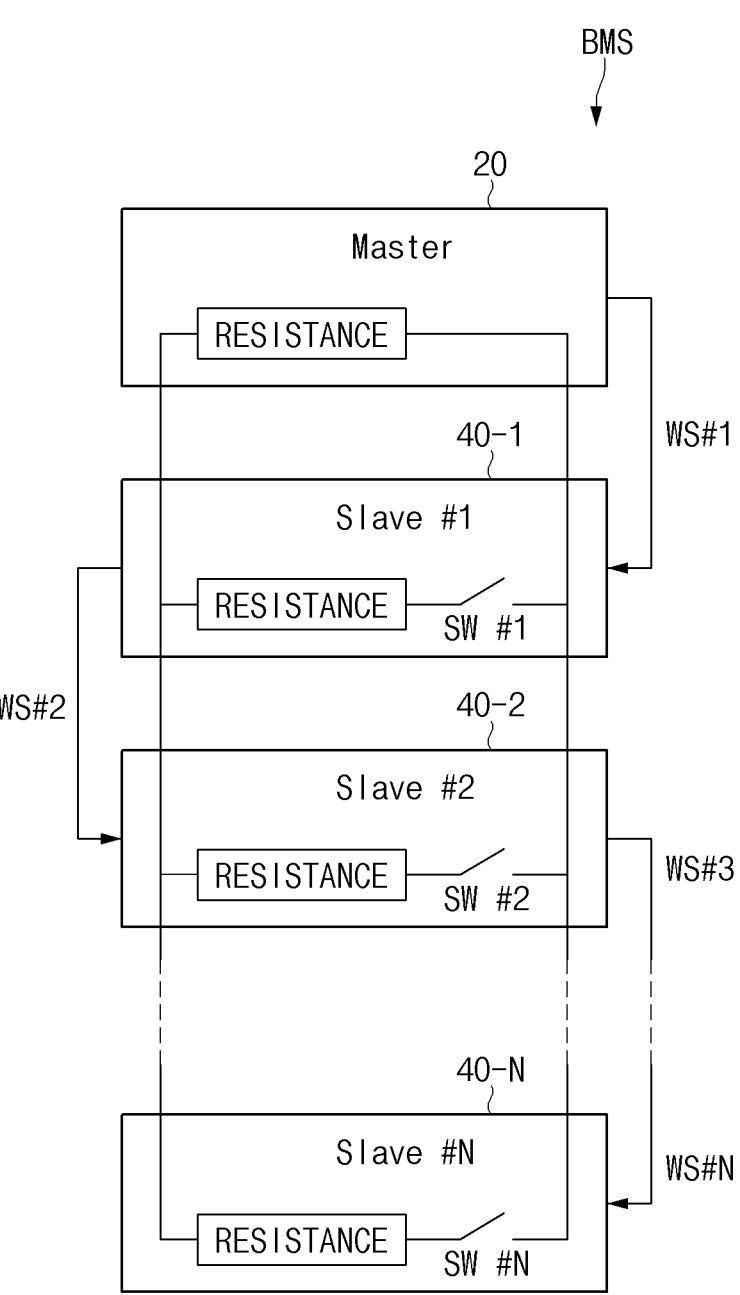
FIG. 2 is a diagram schematically illustrating a method of setting a terminating resistance according to an embodiment of the present invention.

FIG. 2 is a diagram schematically illustrating a method of setting a terminating resistance according to an embodiment of the present invention.

Referring to FIG. 2, the battery management system (BMS) includes the rack controller 20 and the plurality of module controllers 40-1 to 40-N. The rack controller 20 functions as a master. Further, the module controller 40 functions as a slave.

When the operation of the battery rack 1, which is a battery system, starts, for example, when the system is turned ON, the rack controller 20, which is a master, 20 transmits a wake-up signal WS #1 to an adjacent module controller 40-1 in order to assign an ID required for communication.

The module controller 40-1, which is a slave node that has received the wake-up signal WS #1, turns the switching element SW #1 ON to generate a resistance between a pair of communication lines. Then, the module controller 40-1 is assigned an ID through communication with the rack controller 20. The module controller 40-1 for which the ID assignment is completed transmits a wake-up signal WS #2 to the next adjacent module controller 40-2. In this case, the wake-up signal WS #2 acts on the switching element SW #1, so that the switching element SW #1 is turned to an OFF state again.

The module controller 40-2, which is a slave node that has received the wake-up signal WS #2, turns the switching element SW #2 ON to generate a resistance between the pair of communication lines. Further, the module controller 40-2 is assigned an ID through communication with the rack controller 20. The module controller 40-2 for which the ID assignment is completed transmits a wake-up signal WS #3 to the next adjacent module controller 40-3. In this case, the wake-up signal WS #3 acts on the switching element SW #2, so that the switching element SW #2 is turned to the OFF state again.

When the ID assignment for the module controller 40-N, which is the last slave node, is completed by repeating the operation described above, the last module controller 40-N does not need to transmit the wake-up signal any more. Accordingly, the switching element SW #N turned ON by the wake-up signal WS #N maintains its ON state. That is, the switching element SW #N is maintained in a state in which the terminating resistance is generated between the pair of communication lines.

According to the configuration described above, the terminating resistance can be set automatically. Further, all of the module controllers 40-1 to 40-N include the same type of terminating resistance setting circuit. Accordingly, since there is no need to produce a separate module controller for setting the terminating resistance or perform a separate operation to insert the terminating resistance, it is possible to efficiently insert the terminating resistance.

In this embodiment, a configuration for setting the terminating resistance with a wake-up signal used in ID assignment has been described, but is not limited thereto. For example, it is possible to separately generate a control signal for setting the terminating resistance. Further, the rack controller 20 and the module controller 40 may have a dedicated line for receiving a control signal.

Figure 3:
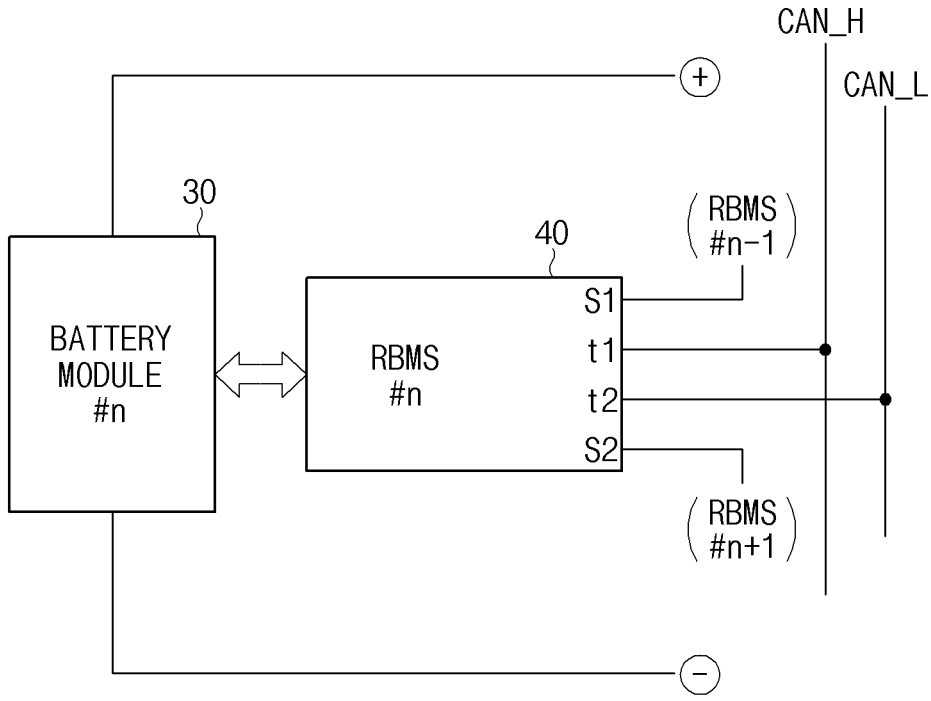
FIG. 3 is a diagram illustrating a configuration of a battery module and a module controller according to an embodiment of the present invention.

FIG. 3 is a diagram illustrating the configuration of the battery module 30 and the module controller 40 according to an embodiment of the present invention.

Referring to FIG. 3, the battery module 30 may be connected in series or parallel with another battery module through a positive terminal and negative terminal thereof. The battery module 30 may be charged or discharged through the positive terminal and the negative terminal.

As described above, the module controller 40 controls the operation of the battery module 30 and monitors the state of the battery module 30. Further, the module controller 40 may be connected to a communication line to communicate with other communication nodes. Here, the other communication nodes include the rack controller 20 corresponding to the master and other module controllers 40 in the communication system. In this embodiment, the rack controller 20 and the module controller 40, which are communication nodes in the battery management system (BMS), communicate using a communication protocol of differential input mode, and a pair of communication lines CAN_H and CAN_L are provided as the communication lines. Hereinafter, description will be made on a case in which CAN communication is used as a communication protocol, but this is for illustrative purposes only, and it will be understood that a communication protocol of another differential input mode may be used.

The module controller 40 may include a pair of terminals t1 and t2 connected to the pair of communication lines. Further, the module controller 40 may be provided with a terminal S1 which is a terminal to which a first control signal is input, and a terminal S2 which is a terminal to which a second control signal is output, that are used in a terminating resistance setting circuit to be described later.

The terminal S1 is a terminal that receives a control signal from a module controller close to itself among the plurality of module controllers 40-1 to 40-N. That is, when the module controller 40 of FIG. 3 is an n-th module controller, the terminal S1 may be a terminal for receiving a control signal transmitted from an (n−1)-th module controller. Accordingly, the terminal S1 may be configured to be connected to the terminal S2 of the (n−1)-th module controller.

The terminal S2 is a terminal that supplies a control signal to another module controller close to itself among the plurality of module controllers 40-1 to 40-N. That is, when the module controller 40 of FIG. 3 is the n-th module controller, the terminal S2 may be a terminal that outputs a control signal supplied to an (n+1)-th module controller. Accordingly, the terminal S2 may be configured to be connected to the terminal S1 of the (n+1)-th module controller.

The terminal S1 and terminal S2 have been described as being connected to adjacent module controllers, but are not necessarily limited to this configuration. However, as long as the plurality of module controllers 40-1 to 40-N can be sequentially connected once, the connection between the terminals need not be limited to the adjacent module controllers.

Hereinafter, the terminating resistance setting circuit included in the module controller 40 will be described in detail.

Figure 4:
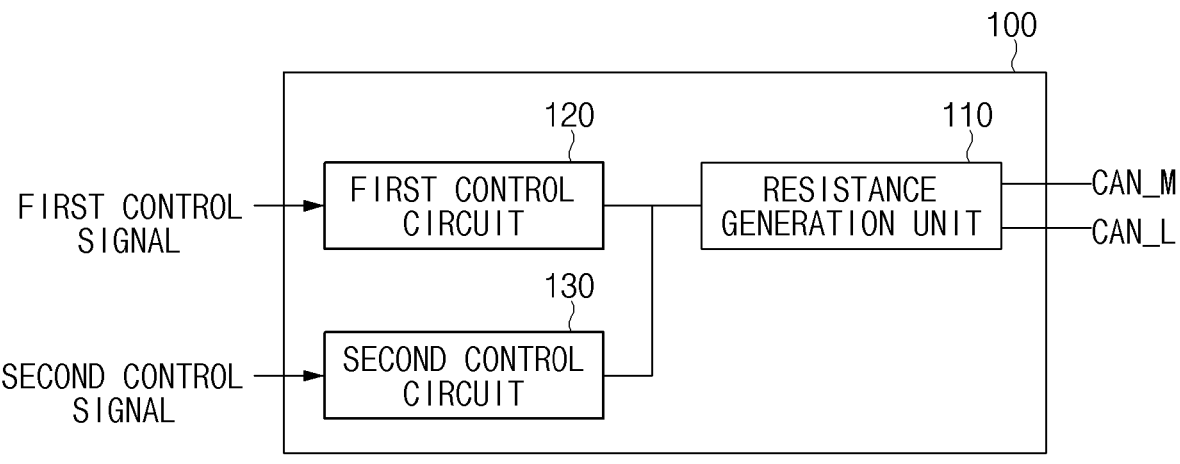
FIG. 4 is a block diagram illustrating a terminating resistance setting circuit according to an embodiment of the present invention.

FIG. 4 is a block diagram illustrating a terminating resistance setting circuit 100 according to an embodiment of the present invention.

Referring to FIG. 4, the terminating resistance setting circuit 100 may include a resistance generation unit 110, a first control circuit 120, and a second control circuit 130.

The resistance generation unit 110 is connected between the pair of communication lines for differential input to generate a terminating resistance. The resistance generation unit 110 includes a resistor and a switching element configured to be connected in series between the pair of communication lines. The resistance generation unit 110 is configured to turn the switching element ON by the first control circuit 120. Further, the resistance generation unit 110 is configured to turn the switching element, which is being turned ON, OFF by the second control circuit 130 again.

The first control circuit 120 applies the first control signal received from the outside to the resistance generation unit 110. When the first control circuit 120 receives the first control signal from the outside, the first control circuit 120 may apply the received first control signal to the resistance generation unit 110 as it is to turn the switching element ON. Alternatively, when the first control circuit 120 receives the first control signal from the outside, the first control circuit 120 may generate another signal for turning the switching element of the resistance generation unit 110 ON by using the received first control signal. Further, the corresponding signal generated may be applied to the resistance generation unit 110 to turn the switching element ON.

The first control circuit 120 receives the first control signal from one of the module controllers other than itself among the plurality of module controllers 40-1 to 40-N.

When the second control circuit 130 receives the second control signal while the switching element of the resistance generation unit 110 is in a state of being ON, the second control circuit 130 switches the switching element back to the OFF state based on the second control signal again. To this end, the second control circuit 130 may be formed between the resistance generation unit 110 and a reference potential, and may be configured to apply a voltage according to the reference potential to the resistance generation unit 110 by the second control signal. Here, the reference potential may be a ground potential.

The second control circuit 130 transmits the second control signal to other module controllers other than itself and the module controller receiving the first control signal, among the plurality of module controllers 40-1 to 40-N.

In this case, the first control signal and the second control signal may be the wake-ups signal transmitted and received by the plurality of module controllers 40-1 to 40-N for which IDs are sequentially assigned. When any module controller 40 receives the wake-up signal from another module controller, the module controller 40 communicates with the rack controller 20, which is the upper-level controller, to perform ID assignment. When the ID assignment is completed, the module controller 40 transmits the wake-up signal to another module controller among the plurality of module controllers 40-1 to 40-N. That is, the received wake-up signal, which is generated by another module controller, corresponds to the first control signal. Further, a signal generated by itself and transmitted to another module controller corresponds to the second control signal.

However, in the embodiments of the present invention, the first control signal and the second control signal are not limited to being wake-up signals used for ID assignment. The first control signal and the second control signal may be dedicated signals for terminating resistance setting that are transmitted and received by being generated separately from the wake-up signal used for ID assignment.

Figure 5:
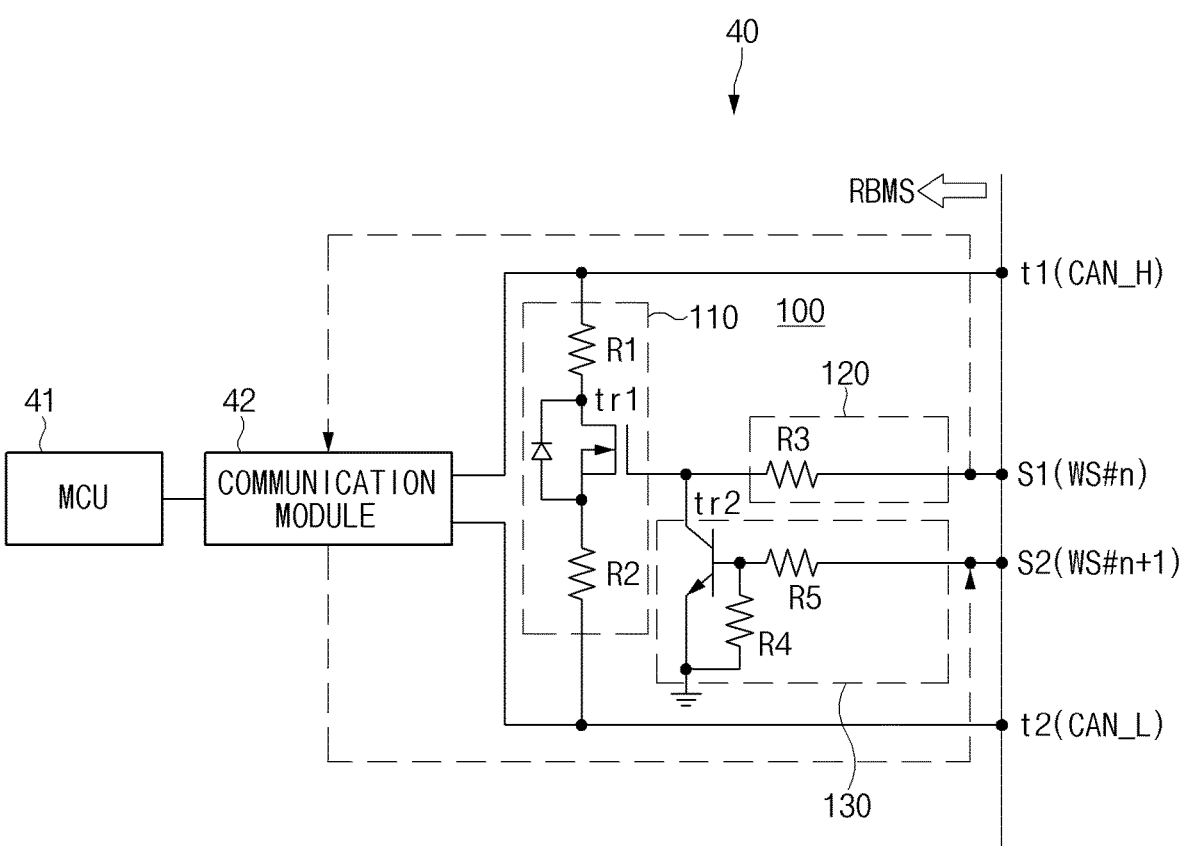
FIG. 5 is a circuit diagram illustrating one implementation example of the terminating resistance setting circuit according to the embodiment of the present invention.

FIG. 5 is a circuit diagram illustrating one implementation example of the terminating resistance setting circuit according to the embodiment of the present invention Referring to FIG. 5, the module controller 40 may include an MCU 41 that is a controller that controls the overall operation of the module controller 40 and a communication module 42 for communicating with external devices, e.g., the rack controller 20 and other module controllers. Further, the module controller 40 may include the terminating resistance setting circuit 100.

As illustrated in FIG. 5, lines extending from the pair of terminals t1 and t2 connected to a pair of communication lines CAN_H and CAN_L are connected to the communication module 42. Further, the terminating resistance setting circuit 100 is provided between the pair of lines extending from the terminals t1 and t2.

In the terminating resistance setting circuit 100, the resistance generation unit 110 is configured such that resistors R1 and R2 and the transistor tr1 designated as a switching element are connected in series. In FIG. 5, it is illustrated that two resistors are formed, but this is an example, and only one resistor may be included, or three or more resistors may be included. The transistor tr1 of the resistance generation unit 110 is normally in the OFF state. Accordingly, the resistance generation unit 110 is in an open state, and the terminating resistance does not occur.

The first control circuit 120 is a circuit formed between the terminal S1 and the resistance generation unit 110. Specifically, the first control circuit 120 may include at least a resistor R3 connected between the control terminal of the transistor tr1 and the terminal S1. The first control circuit 120 receives the first control signal through the terminal S1. As described above, the first control signal may be a wake-up signal transmitted from a previous module controller.

The second control circuit 130 is formed between the resistance generating unit 110 and a reference potential. The second control circuit 130 may include at least a transistor tr2 connected between the control terminal of the transistor tr1 of the resistance generation unit 110 and the reference potential. A resistor R4 and a resistor R5 may be formed between the control terminal and the transistor tr2 and the reference potential and between the terminal and S2, respectively. As illustrated, the reference potential may be a ground potential.

Now, a description will be made on how the terminating resistance setting circuit 100 operates.

As described above, in the resistance generation unit 110, the transistor tr1 is in the OFF state, and thus no resistance is generated between the pair of communication lines.

In this case, when the first control circuit 120 receives the first control signal, the first control signal is applied to the control terminal of the transistor tr1 of the resistance generation unit 110. With this configuration, the transistor tr1 turns to the ON state, and the resistance is generated between the pair of communication lines. In the case of FIG. 5, the magnitude of the generated resistance is R1+R2.

The first control signal may be the wake-up signal for starting the communication module 42. Accordingly, a wake-up signal WS #n, which is the first control signal transmitted from the previous module controller, is applied to the communication module 42. The communication module 42 is started by a wake-up signal WS #n to perform an ID assignment operation. When ID assignment is completed, a wake-up signal (WS #n+1) is transmitted to the next module controller to start the ID assignment of the next module controller.

When the communication module 42 transmits the wake-up signal WS #n+1 to the next module controller, the second control circuit 130 uses the corresponding signal as a second control signal. The second control circuit 130 turns the transistor tr2 ON when the second control signal is applied thereto. When the transistor tr2 turns to the ON state, the control terminal of the transistor tr1 of the resistance generation unit 110 is connected to the ground terminal. When the ground potential, which is the reference potential, is applied to the control terminal of the transistor tr1, the transistor tr1 turns to the OFF state again from the ON state. That is, the terminating resistance generated by the first control signal is removed by the second control signal.

In this way, when the module controller 40 is not a communication node located at the termination in the communication system, the module controller 40 should transmit the wake-up signal to the next module controller. Further, the corresponding wake-up signal is used as a second control signal to perform the function of removing the generated terminating resistance.

Therefore, according to the terminating resistance setting circuit 100 according to this embodiment, the terminating resistance is automatically generated only in the module controller located at the termination without the need to perform a separate operation such as directly inserting the terminating resistance, thereby capable of efficiently and conveniently inserting the terminating resistance.

In this embodiment, although it is illustrated that an N-channel MOSFET is used as the transistor tr1 and a BJT of NPN type is used as the transistor tr2, this is for illustrative purposes only, and it will be appreciated by those of ordinary skill in the art that other types of transistors or switching elements other than transistors may be used.

Figure 6:
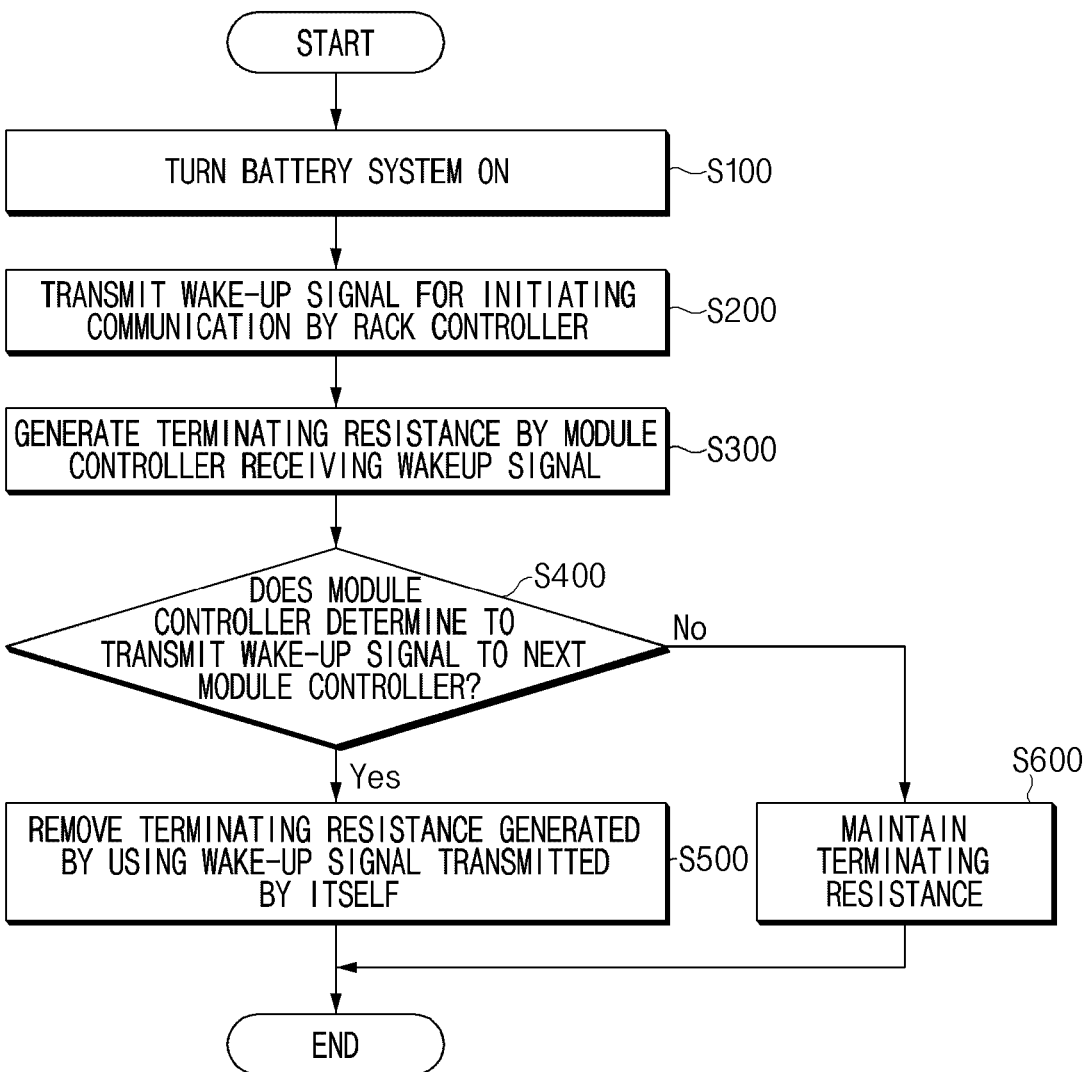
FIG. 6 is a flowchart illustrating the method of setting the terminating resistance according to an embodiment of the present invention.

FIG. 6 is a flowchart illustrating a method of setting a terminating resistance according to an embodiment of the present invention.

When the battery system is turned ON (S100), the rack controller 20 transmits a wake-up signal to any one of the module controllers in order to communicate with the module controllers 40 existing in the battery system (S200).

The module controller 40 receiving the wake-up signal generates a terminating resistance by the wake-up signal (S300). Then, the module controller 40 determines whether to transmit the wake-up signal to the next module controller (S400). That is, the module controller 40 determines whether the module controller 40 is the last communication node located at the termination in the battery system.

In the case of transmitting the wake-up signal to the next module controller, the terminating resistance generated by using the wake-up signal transmitted by itself is removed (S500). On the other hand, when the module controller 40 is the last communication node located at the termination, the wake-up signal is not transmitted to the next module controller, and thus the generated terminating resistance is maintained as it is (S600).

Figure 7:
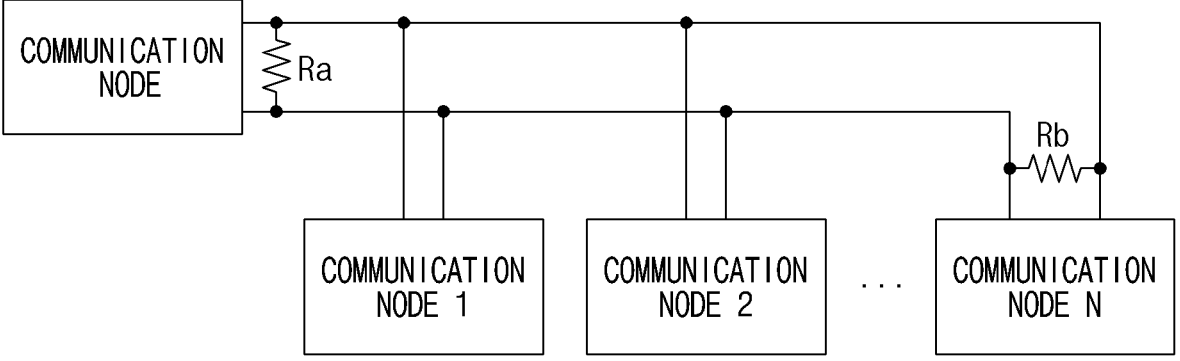
FIG. 7 is a diagram for describing a method of setting terminating resistance of communication nodes according to the related art.

FIG. 7 is a diagram for describing a method of setting a terminating resistance of communication nodes according to the related art.

In FIG. 7, a plurality of communication nodes are included in the system, and terminating resistances Ra and Rb are respectively formed in the communication node located at the end and the communication node N among the plurality of communication nodes.

In the past, the terminating resistances Ra and Rb were directly inserted by the operator. Accordingly, there was a concern that the operator would omit the insertion of the terminating resistance or insert the terminating resistance into the wrong location, that is, the wrong communication node. Further, there is a possibility that both ends of a resistor may be short-circuited to change the resistance value when inserting the resistor, other failures may occur due to resistor insertion work.

However, in the case of using the terminating resistance setting circuit according to the embodiment of the present invention as described above, it is possible to efficiently and conveniently set the terminating resistance.

Figure 8:
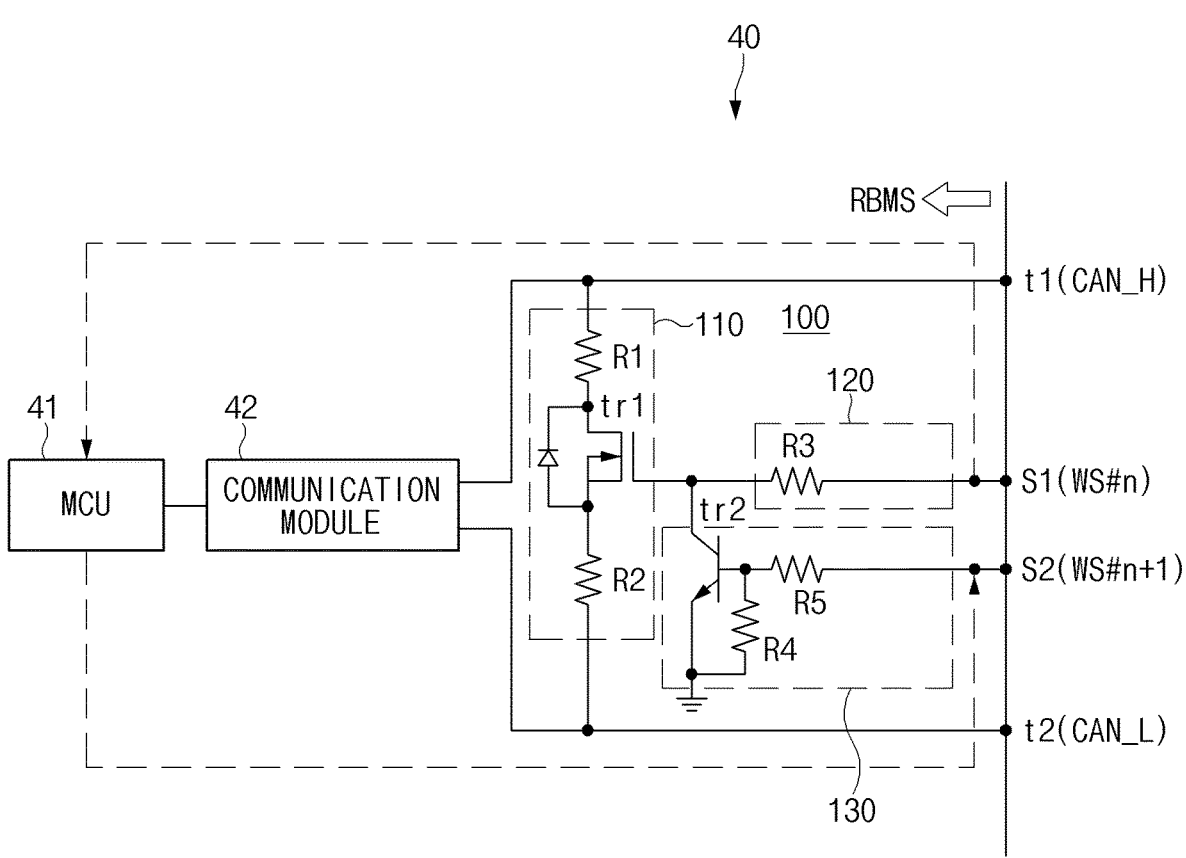
FIG. 8 is a circuit diagram illustrating another implementation example of the terminating resistance setting circuit according to the embodiment of the present invention.

FIG. 8 is a circuit diagram illustrating another implementation example of the terminating resistance setting circuit according to the embodiment of the present invention. In this implementation example, a different part from that in FIG. 5 will be mainly described.

Referring to FIG. 8, the module controller 40 may include the MCU 41 which is a controller that controls the overall operation of the module controller 40 and the communication module 42 for communicating with external devices, for example the rack controller 20 and other module controllers. Further, the module controller 40 may include the terminating resistance setting circuit 100.

Further, similarly as in FIG. 5, the lines extending from the pair of terminals t1 and t2 connected to the pair of communication lines CAN_H and CAN_L are connected to the communication module 42. Further, the terminating resistance setting circuit 100 is provided between the pair of lines extending from the terminals t1 and t2.

However, in this implementation example, the wake-up signal WS #n as the first control signal applied to the terminal S1 is directly applied to the MCU 41 instead of the communication module 42. The MCU 41 is started when the wake-up signal WS #n is applied to start the communication module 42. Further, when ID assignment is completed, the MCU 41 generates a wake-up signal WS #n+1 for transmission to the next module controller and supplies the wake-up signal WS #n+1 to the terminal S2. This wake-up signal WS #n+1 is used as the second control signal.

As described above, the terminating resistance setting circuit 100 is configured in the same form as in FIG. 5 except that the subject for transmitting and receiving the wake-up signal is changed to the MCU 41 instead of the communication module 42.

Even in the case of this implementation example, the same effect as in FIG. 5 may be achieved.

In addition, the terms such as "include", "configure" or "have" described above mean that the corresponding constituent element may be embedded unless otherwise described, and thus the terms should be interpreted as being capable of further including other constituent elements, rather than excluding other constituent elements. All terms used herein including technical or scientific terms may be interpreted as having the same meaning as generally understood by a person of ordinary skill in the art, unless otherwise defined. Terms generally used, such as terms defined in the dictionary, should be interpreted as being consistent with the meaning of the context of related technology, and are not to be interpreted as an ideal or excessively formal meaning unless explicitly defined in the present invention.

The above description is merely illustrative of the technical idea of the present invention, and those of ordinary skill in the art to which the present invention pertains will be able to make various modifications and variations without deviating from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the claims set forth below, and all technical ideas within the scope equivalent thereto should be construed as being included in the scope of the present invention.

US 12,603,800 B2

11

The invention claimed is:

1. A terminating resistance setting circuit provided in each of a plurality of communication devices that perform communication in a differential input mode, the terminating resistance setting circuit comprising:

a resistance generation unit connected between a pair of communication lines for differential input to generate a terminating resistance;

a first control circuit that applies a first control signal to the resistance generation unit;

a second control circuit formed between the resistance generation unit and a reference potential and controlled to apply a voltage according to the reference potential to the resistance generation unit by a second control signal; and a line connecting the pair of communication lines with a first terminal connected to the first control circuit and a second terminal connected to the second control circuit, wherein the first control signal is a second control signal transmitted by another communication device among the plurality of communication devices that communicates with a first communication device among the plurality of communication devices in which the terminating resistance setting circuit is formed.

2. The terminating resistance setting circuit of claim 1, wherein the resistance generation unit includes a resistor and a first switching element connected in series between the pair of communication lines.

3. The terminating resistance setting circuit of claim 2, wherein the first switching element is turned to an ON state by application of the first control signal.

4. The terminating resistance setting circuit of claim 3, wherein the first switching element is switched from the ON state to an OFF state due to application of the second control signal to the second control circuit.

5. The terminating resistance setting circuit of claim 1, wherein the second control signal is a first control signal transmitted by the first communication device among the plurality of communication devices in which the terminating resistance setting circuit is formed to a terminating resistance setting circuit installed in another communication device among the plurality of communication devices.

6. The terminating resistance setting circuit of claim 1, wherein the pair of communication lines connects to a first port and second port of the first communication device.

7. The terminating resistance setting circuit of claim 1, wherein the second control circuit includes a transistor, and wherein a port of the transistor of the second control circuit is located closer to the resistance generation unit than the first control circuit.

8. The terminating resistance setting circuit of claim 1, wherein the first control circuit only includes a resistor.

9. The terminating resistance setting circuit of claim 1, wherein the first control circuit includes less resistors than the resistance generation unit.

* * * * *